(12) United States Patent
Kondo et al.

(10) Patent No.: US 8,881,690 B2
(45) Date of Patent: Nov. 11, 2014

(54) STEAM GENERATOR

(75) Inventors: Yoshiyuki Kondo, Hyogo (JP); Koichi Tanimoto, Hyogo (JP); Toshiyuki Mizutani, Hyogo (JP); Kengo Shimamura, Hyogo (JP); Ryoichi Kawakami, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 954 days.

(21) Appl. No.: 12/666,658

(22) PCT Filed: Feb. 20, 2009

(86) PCT No.: PCT/JP2009/053030
§ 371 (c)(1),
(2), (4) Date: Mar. 11, 2010

(87) PCT Pub. No.: WO2009/107556
PCT Pub. Date: Sep. 3, 2009

(65) Prior Publication Data
US 2010/0212605 A1    Aug. 26, 2010

(30) Foreign Application Priority Data

Feb. 29, 2008 (JP) .................... 2008-051043

(51) Int. Cl.
*F22B 21/04* (2006.01)
*F22B 1/16* (2006.01)
*G21D 1/02* (2006.01)

(52) U.S. Cl.
CPC . *G21D 1/02* (2013.01); *Y02E 30/40* (2013.01); *F22B 1/162* (2013.01)
USPC ............... 122/459; 122/32; 122/34; 122/467; 122/468; 122/470

(58) Field of Classification Search
USPC ............. 122/32, 34, 459, 467, 468, 470, 511, 122/512
See application file for complete search history.

(56) References Cited

U.S. PATENT DOCUMENTS 3,854,453 A * 12/1974 Mayer et al. .................... 122/32
4,208,987 A * 6/1980 Chaix et al. .................... 122/32
(Continued)

FOREIGN PATENT DOCUMENTS

JP  48-061894 A  8/1973
JP  3-087501 A  4/1991
(Continued)

OTHER PUBLICATIONS

International Search Report of PCT/JP2009/053030, mailing date of Apr. 21, 2009.
Korean Decision to Grant a Patent has been received dated May 24, 2012, issued in corresponding Korean Patent Application No. 10-2010-7000312, (2 pages).
Japanese Decision to Grant A Patent dated Jul. 17, 2012, issued in corresponding Japanese Patent Application No. 2008-051043, (6 pages). With English Translation.

*Primary Examiner* — Kang Hu
*Assistant Examiner* — Nathaniel Herzfeld
(74) *Attorney, Agent, or Firm* — Westerman, Hattori, Daniels & Adrian, LLP

(57) ABSTRACT

A steam generator having a heat transfer tube group formed of a plurality of U-shaped heat transfer tubes; an annular channel formed to cover the circumference of the heat transfer tube group; the annular channel having an opening that communicates with the heat transfer tube group; a water supply unit disposed at an upper portion of the annular channel and supplies water to a descending-side portion; a steam/water separator disposed above the heat transfer tube group; and an air bubble removing member for removing air bubbles provided in the annular channel.

5 Claims, 11 Drawing Sheets

(56) References Cited

U.S. PATENT DOCUMENTS

| | | | |
|---|---|---|---|
| 4,318,368 A * | 3/1982 | Carson et al. | 122/34 |
| 4,357,908 A * | 11/1982 | Yazidjian | 122/32 |
| 4,554,889 A * | 11/1985 | Lilly | 122/32 |
| 4,633,940 A * | 1/1987 | Gentry et al. | 165/159 |
| 5,042,433 A * | 8/1991 | Monnier | 122/510 |
| 5,110,538 A | 5/1992 | Pascal et al. | |
| 5,419,391 A * | 5/1995 | Chan et al. | 165/159 |
| 5,466,272 A * | 11/1995 | Karlsson et al. | 55/457 |
| 5,735,680 A * | 4/1998 | Henkelmann | 431/5 |
| 5,972,171 A * | 10/1999 | Ross et al. | 203/40 |
| 6,173,680 B1 | 1/2001 | Dague et al. | |
| 6,302,064 B1 * | 10/2001 | Billoue et al. | 122/491 |

FOREIGN PATENT DOCUMENTS

| | | |
|---|---|---|
| JP | 08-334201 A | 12/1996 |
| JP | 2000-009888 A | 1/2000 |
| JP | 2002-143620 A | 5/2002 |
| JP | 2002-333288 A | 11/2002 |
| JP | 2003-004885 A | 1/2003 |
| JP | 2003-329793 A | 11/2003 |

* cited by examiner

STEAM GENERATOR

TECHNICAL FIELD

The present invention relates to steam generators.

BACKGROUND ART

For example, in an approximately cylindrical-shaped barrel portion of a steam generator in a pressurized-water nuclear power plant, a heat transfer tube group formed of a number of heat transfer tubes that are bent in a U-shape and whose ends are secured to a tube plate is provided in a state where it is covered by a tube-group outer casing.

Water (supply water) supplied to an upper portion of an annular channel formed between the inner wall of the barrel portion and the tube-group outer casing flows down through the annular channel, flows into the tube-group outer casing from a lower portion of the annular channel, and rises along the heat transfer tubes. During this process, since pressurized high-temperature coolant from a reactor flows through the heat transfer tubes and heats the heat transfer tubes, the water that is in contact with the outer surfaces of the heat transfer tubes is heated and moves upward while evaporating.

By means of a steam/water separator provided above the heat transfer tube group, the water is separated by into steam and hot water, and the hot water is returned to the annular channel whereas the steam is sent, for example, to a turbine in a secondary system after moisture contained in the steam is separated therefrom.

Since the supply water takes heat from the high-temperature coolant flowing through the heat transfer tubes, the temperature of the coolant is gradually reduced from an inlet side toward an outlet side. In this way, since the coolant in the heat transfer tubes has a relative temperature difference, an area located from the inlets of the heat transfer tubes to the apexes of the U-shape thereof may also be referred to as a hot side and an area located from the apexes to the outlets thereof may also be referred to as a cold side.

In this steam generator, since the supply water is mixed in the entire area of a lower portion of the tube-group outer casing, the temperature of the supply water in this portion is made similar, thus reducing the temperature difference between the coolant in the outlets of the heat transfer tubes and the supply water. Therefore, since the amount of heat exchange is reduced in this portion, the total amount of heat exchange of the steam generator is reduced.

Various ways of improving this point have been proposed, and, for example, Patent Citations 1 and 2 describe examples thereof.

In the examples, supply water is supplied only to a cold-side portion of an annular channel to reduce the temperature of the supply water flowing into the cold side. This increases the temperature difference between the coolant in the outlets of the heat transfer tubes and the supply water to increase the amount of heat exchange in this portion.

Patent Citation 1:
Japanese Unexamined Patent Application, Publication No. Hei-03-87501
Patent Citation 2:
Japanese Unexamined Patent Application, Publication No. 2000-9888

DISCLOSURE OF INVENTION

The hot water separated by the steam/water separator includes fine air bubbles or is likely to generate air bubbles by involving ambient air. Conventionally, water is supplied in a full-scale manner, thereby cooling the hot water to condense such air bubbles.

In the technologies described in Patent Citations 1 and 2, since water is not supplied to the hot side, generated air bubbles remain as they are. So-called carry-under, in which the air bubbles descend together with supply water, occurs.

When carry-under occurs (is increased), loss of supply water transfer pressure is increased, and thus the supply water does not flow smoothly in the hot side. Accordingly, because the amount of supply water flowing in the hot side is reduced, reducing the amount of heat exchange, the total amount of heat exchange may be reduced.

In view of the above-described problems, an object of the present invention is to provide a steam generator in which the total heat transfer efficiency can be improved by suppressing a reduction in the amount of heat exchange at an inlet side of heat transfer tubes while maintaining the effect of increasing the amount of heat exchange at an outlet side thereof.

In order to solve the above-described problems, the present invention employs the following solutions.

Specifically, according to an aspect, the present invention provides a steam generator including: a heat transfer tube group that is formed of a plurality of heat transfer tubes in each of which both ends thereof are secured to a tube plate and each of which has a U-shaped free end in which a heat medium flows from one end toward the other end; an annular channel that is formed so as to cover the circumference of the heat transfer tube group and that has an opening, at a lower portion thereof, that communicates with the heat transfer tube group; a water supply unit that is disposed at an upper portion of the annular channel and that supplies water to a descending-side portion serving as an area where the heat medium in the heat transfer tubes descends toward the other end; and a steam/water separator that is disposed above the heat transfer tube group and that separates water heated while passing from the annular passage along the circumference of the heat transfer tubes into steam and hot water, in which an air bubble removing member for removing air bubbles is provided in the annular channel, in a rising-side portion serving as an area where the heat medium in the heat transfer tubes rises from the one end.

According to the steam generator of this aspect, the water supply unit is disposed at an upper portion of the annular channel and supplies water to a descending-side portion serving as an area where the heat medium in the heat transfer tubes descends toward the other end, in other words, a cold-side portion serving as a relatively-low-temperature area located from the apexes of the heat transfer tubes to the outlets thereof; therefore, it is possible to reduce the temperature of supply water flowing into the descending-side portion, serving as an outlet portion of the heat transfer tubes. When the temperature of the supply water flowing into the descending-side portion is reduced, a large temperature difference can be produced between a relatively-low-temperature heat medium flowing in the outlet portion of the heat transfer tubes and the supply water, and thus the amount of heat exchange can be increased in this portion.

Further, since the air bubble removing member is disposed in the annular channel located in the rising-side portion, which serves as an area where the heat medium in the heat transfer tubes rises from the one end, in other words, the hot-side portion, which serves as a relatively-high-temperature area located from the inlets of the heat transfer tubes to the apexes thereof, it is possible to remove air bubbles in the rising-side portion. When air bubbles are removed in an upper portion of the rising-side portion, it is possible to suppress, in the rising-side portion, the occurrence of so-called carry-under, in which air bubbles descend together with supply water. This can suppress an increase in loss of supply water transfer pressure in the rising-side portion, and therefore, it is possible to prevent a reduction in the amount of supply water flowing in the hot side and to maintain the amount of heat exchange in the rising-side portion, as in a conventional manner.

Therefore, since a reduction in the amount of heat exchange in the rising-side portion can be suppressed while maintaining the effect of increasing the amount of heat exchange in the descending-side portion of the heat transfer tubes, the total heat transfer efficiency can be improved.

In the aspect, a configuration may be used in which the air bubble removing member is a porous plate that has a plurality of through-holes.

With this configuration, a flow of supply water stagnates at portions of the porous plate without the through-holes, so that air bubbles that move downward when the supply water descends, in other words, air bubbles that have small volumes and small buoyancies, are accumulated.

When the air bubbles are accumulated, they coalesce to form air bubbles that have large volumes. Since the buoyancies of the air bubbles are increased when the volumes thereof are increased, they come up through the through-holes against the descending supply water and are discharged to the space above.

In this way, it is possible to suppress, in the rising-side portion, the occurrence of so-called carry-under, in which the air bubbles descend together with supply water.

In the configuration, the porous plate may be disposed in the annular channel at a position where the steam/water separator is disposed.

In the configuration, the porous plate may be disposed at a position away from the steam/water separator, downward in the annular channel.

In the aspect, the air bubble removing member may be a water supply member that supplies water for condensing the air bubbles.

In this way, since the water supply member supplies a sufficient amount of water for condensing air bubbles, air bubbles in an upper portion of the rising-side portion are cooled and condensed. Therefore, it is possible to suppress, in the rising-side portion, the occurrence of so-called carry-under, in which the air bubbles descend together with the supply water.

Note that the sufficient amount of water for condensing air bubbles, supplied by the water supply member, is, for example, 5 to 10% of the amount of water supplied from the water supply unit, for example, and an influence on the heat-exchange increasing effect in the descending-side portion can be suppressed.

In the aspect, in a tube supporting plate that supports the heat transfer tubes, the opening area in the rising-side portion may be larger than the opening area in the descending-side portion.

The heat transfer tubes are supported by tube supporting plates that laterally extend at positions located in the vertical direction and that have openings through which supply water passes.

According to the present invention, in the tube supporting plates for supporting the heat transfer tubes, the opening areas in the rising-side portion are larger than the opening areas in the descending-side portion, and therefore, the flow resistance in the rising-side portion, that is, the hot-side portion, is reduced. Since supply water flow improves in the rising-side portion when the flow resistance in the rising-side portion is reduced, the supply water easily circulates in the upstream-side portion, and the occurrence of an unstable flow can be suppressed.

Therefore, since a reduction in the amount of heat exchange in the rising-side portion can be suppressed, the total heat transfer efficiency can be improved.

In the aspect, a heat-transfer-tube partitioning plate that partition the rising-side portion and the descending-side portion may be provided at a lower portion of the heat transfer tube group, and a channel in the descending-side portion partitioned by the heat-transfer-tube partitioning plate may be a serpentine channel.

This makes supply water meander upward in the descending-side portion partitioned by the heat-transfer-tube partitioning plate, so that supply water flows in lateral directions.

When supply water flows in the lateral directions, the number of chances, in other words, the duration of time, for it to make contact with the heat transfer tubes is increased compared with a case where supply water simply rises, and thus the amount of received heat can be increased accordingly.

Therefore, since the heat exchange efficiency in the descending-side portion is improved, the total heat transfer efficiency can be improved.

In the aspect, a plurality of openings that make the annular channel communicate with the heat transfer tube group are provided at points with gaps being provided therebetween in a vertical direction, in a lower portion of the heat transfer tube group.

Since supply water flows in the lateral direction at the water supply points, the number of chances, in other words, the duration of time, for it to make contact with the heat transfer tubes is increased, and thus the amount of received heat can be increased accordingly.

Since water is supplied to the descending-side portion from a plurality of points with gaps being provided therebetween in the vertical direction, the heat exchange efficiency is improved compared with a case where water is supplied from a single lowermost point, and thus the total heat transfer efficiency can be improved.

Note that, in this case, it is preferable that the lower portion of the heat transfer tube group be partitioned into the rising-side portion and the descending-side portion, so as to supply water to the descending-side portion.

In the aspect, a partitioning plate that vertically divides the annular channel into the rising-side portion and the descending-side portion is further included, in which, in at least a lower portion of the partitioning plate, a circumferential region in the rising-side portion becomes gradually smaller in the downward direction than a circumferential region in the descending-side portion.

This supplies water supplied from the water supply unit, also to the rising-side portion, and therefore, the temperature of supply water in a lower position of the rising-side portion can be reduced.

When the temperature of the supply water in the lower position of the rising-side portion is reduced, the difference in temperature between heat medium flowing in the heat transfer tubes and the supply water is increased even in the rising-side portion, and therefore, the heat exchange efficiency can be improved.

In the aspect, anti-vibration bars inserted between free ends of the heat transfer tubes adjacent to each other may be arranged such that the arrangement density in the rising-side portion is lower than the arrangement density in the descending-side portion.

In the aspect, a resistance porous plate having a plurality of through-holes may be further included at a position in the descending-side portion between the heat transfer tube group and the steam/water separator.

In this aspect, a plurality of steam/water separators may be provided, of which a steam/water separator that is positioned in the descending-side portion has an orifice channel resistance at an inlet thereof.

Alternatively, those structures may be combined.

This makes the channel resistance in the descending-side portion larger than that in the rising-side portion, and therefore, supply water flows in the rising-side portion more easily than in the descending-side portion. Accordingly, more supply water flows in the rising-side portion, and therefore, the proportion of air bubbles in the upper portion of the rising-side portion can be reduced.

Therefore, since air bubbles can be prevented from being mixed into supply water to be supplied to the rising-side portion in combination with air-bubble removal by an air bubble removing member, it is possible to effectively prevent an unstable flow in the rising-side portion and to improve the heat exchange efficiency.

According to the present invention, since the water supply unit that supplies water to the descending-side portion in the upper portion of the annular channel is provided with the air bubble removing member in the rising-side portion, it is possible to increase the amount of heat exchange in the descending-side portion and to maintain the amount of heat exchange in the rising-side portion, as in a conventional manner.

As described above, since a reduction in the amount of heat exchange in the rising-side portion can be suppressed while maintaining the effect of increasing the amount of heat exchange in the descending-side portion of the heat transfer tubes, the total heat transfer efficiency can be improved.

EXPLANATION OF REFERENCE

Figure 1:
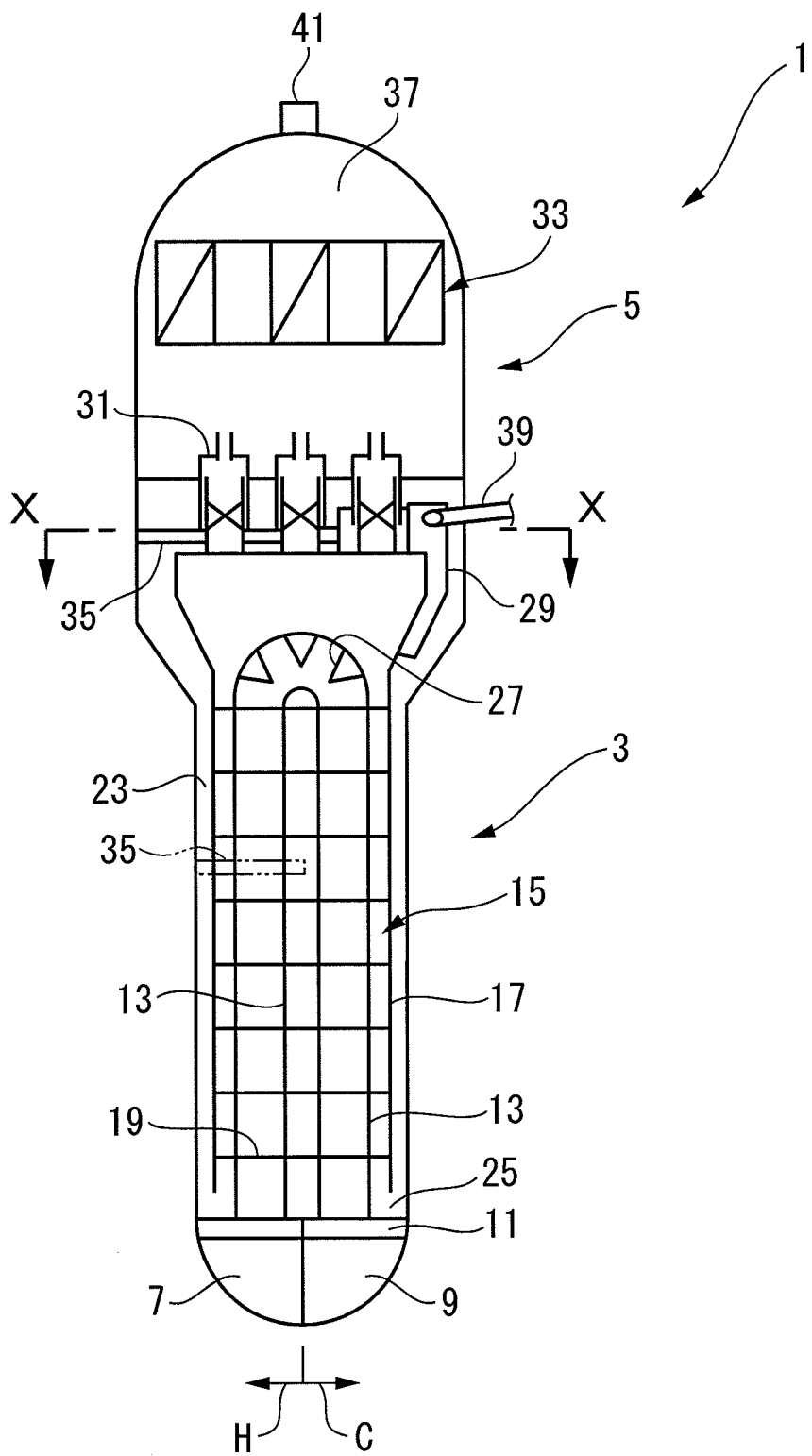
FIG. 1 is a longitudinal cross section schematically showing, in outline, the overall structure of a steam generator according to a first embodiment of the present invention.

1: steam generator
11: tube plate
13: heat transfer tube
15: heat transfer tube group
23: annular channel
25: opening
29: water supply box
31: steam/water separator
35: porous plate
43: through-hole
45: water supply pipe
47: heat-transfer-tube partitioning plate
53: inflow pore
55: partitioning plate
57: resistance porous plate
59: orifice channel resistance
D: serpentine channel
C: cold-side portion
H: hot-side portion

BEST MODE FOR CARRYING OUT THE INVENTION

Embodiments of the present invention will be described below with reference to the drawings.

First Embodiment

Figure 2:
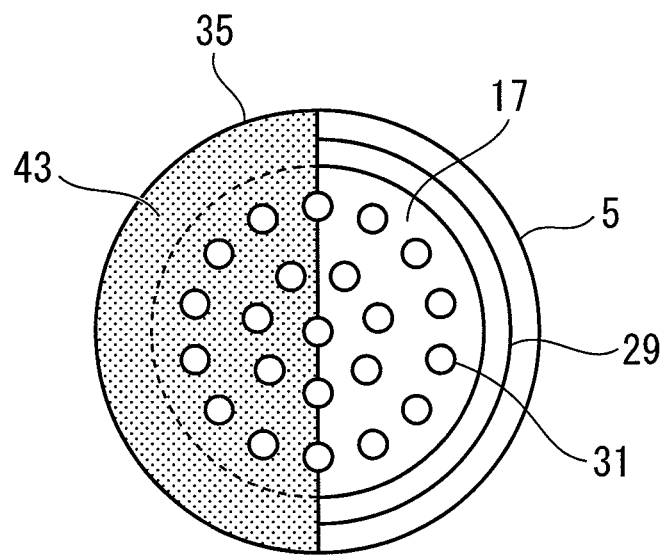
FIG. 2 is a cross section taken along arrows X-X shown in FIG. 1.
Figure 3:
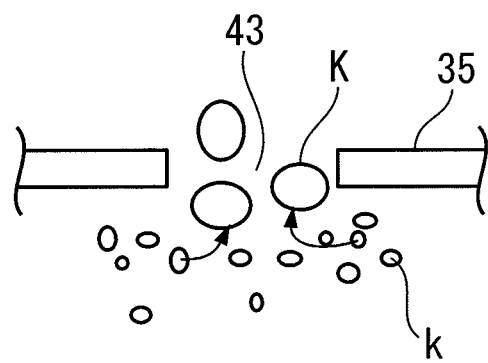
FIG. 3 is a partial longitudinal cross section of a porous plate according to the first embodiment of the present invention.

A first embodiment of the present invention will be described below with reference to FIGS. 1 to 3.

In this embodiment, the present invention is applied to a steam generator 1 in a pressurized-water nuclear power plant. Note that this embodiment does not limit the invention. Further, in this embodiment, components that a person skilled in the art can replace and can easily make or components that are substantially the same can be used.

FIG. 1 is a longitudinal cross section schematically showing, in outline, the overall structure of the steam generator 1. FIG. 2 is a cross section taken along arrows X-X shown in FIG. 1. FIG. 3 is a partial longitudinal cross section of a porous plate.

The steam generator 1 includes a lower barrel 3 having an approximately cylindrical shape and an upper barrel 5 having an approximately cylindrical shape.

The lower barrel 3 includes a first water chamber 7, a second water chamber 9, a tube plate 11, a heat transfer tube group 15 formed of a number of heat transfer tubes 13, and a tube-group outer casing 17.

The first water chamber 7 and the second water chamber 9 are disposed so as to divide a lower portion of the lower barrel 3 into two. Primary coolant from a reactor is introduced to the first water chamber 7 through a nozzle (not shown).

The primary coolant introduced to the first water chamber 7 passes through a plurality of heat transfer tubes 13 and is recovered in the second water chamber 9. The primary coolant recovered in the second water chamber 9 is discharged toward the reactor through a nozzle (not shown).

The heat transfer tubes 13 are bent to have a U-shape.

Both ends of each of the heat transfer tubes 13 are secured to the tube plate 11 provided on upper portions of the first water chamber 7 and the second water chamber 9, so as to pass through the tube plate 11. The heat transfer tubes 13 extend upward from the tube plate 11, and free ends thereof are positioned at almost an upper end of the lower barrel 3.

Attachment positions of both ends of the heat transfer tubes 13 to the tube plate 11 are positions where one end thereof is communicated with the first water chamber 7 and the other end thereof is communicated with the second water chamber 9.

The heat transfer tubes 13 are arrayed along planes parallel to each other. In each plane, the heat transfer tubes 13 are arrayed such that the radii of curvature of the free ends thereof are gradually increased from the inner side toward the outer side.

The number of included heat transfer tubes 13 is gradually reduced from the top, going outward from the axis of the lower barrel 3.

Therefore, the free ends of the heat transfer tubes 13 form an approximately hemispherical shape as a whole, and the lower portions thereof form the heat transfer tube group 15 having an approximately cylindrical shape.

A plane connecting the apexes of the respective heat transfer tubes 13 is perpendicular to the plane of the paper of FIG. 1 and extends to pass through the border between the first water chamber 7 and the second water chamber 9. The first water chamber 7 side of this plane is an area in which high-temperature primary coolant introduced to the first water chamber 7 rises through the heat transfer tubes 13, and is therefore referred to as a hot-side portion (rising-side portion) H.

On the other hand, the second water chamber 9 side thereof is an area in which the primary coolant whose heat has been exchanged in the hot-side portion and thus whose temperature has been relatively reduced descends through the heat transfer tubes 13 toward the second water chamber 9, and is therefore referred to as a cold-side portion (descending-side portion) C.

The tube-group outer casing 17 has an approximately cylindrical shape with one end face thereof being opened and is provided so as to cover the heat transfer tube group 15.

Straight tube portions of the heat transfer tubes 13 are supported by a plurality of tube supporting plates 19 provided in a vertical direction with gaps therebetween. Each of the tube supporting plates 19 has through-holes 21 (see FIG. 6) in portions where the heat transfer tubes 13 are supported.

A gap is provided between the tube-group outer casing 17 and the inner wall of the lower barrel 3 and the upper barrel 5, so as to form an annular channel 23 through which supply water flows.

The tube-group outer casing 17 and the heat transfer tube group 15 are substantially united via the tube supporting plates 19. A gap is provided between a lower end position of the tube-group outer casing 17 and an upper end position of the tube plate 11 so as to form an opening 25 for communicating between the inside (the heat transfer tube group 15) of the tube-group outer casing 17 and the annular channel 23.

At the free end portion of the heat transfer tubes 13, anti-vibration bars 27 are inserted between adjacent rows to prevent vibration of the heat transfer tubes 13.

The upper barrel 5 includes a water supply box (water supply unit) 29, a plurality of steam/water separators 31, a moisture separator 33, a porous plate (air bubble removing member) 35, and a steam chamber 37.

The water supply box 29 has a semi-ring shape and is mounted at a lower portion of the upper barrel 5 along the cold-side portion C at the upper portion of the tube-group outer casing 17. The water supply box 29 supplies the cold-side portion C of the annular channel 23 with secondary-coolant-system water supplied through a supply-water inlet nozzle 39.

A plurality of, for example, 20, steam/water separators 31 are provided on the upper surface of the tube-group outer casing 17 with appropriate gaps being provided therebetween. The steam/water separators 31 crudely separate steam mixed with water that has passed through the heat transfer tube group 15 into steam and water (hot water). The water separated by the steam/water separators 31 is returned to the annular channel 23.

The steam crudely separated by the steam/water separators 31 is introduced to the moisture separator 33, and moisture contained in the steam is separated therefrom. The steam from which moisture has been separated and eliminated is sent from the steam chamber 37 through a steam outlet nozzle 41 to a turbine in a secondary system, for example.

The porous plate 35 is a plate member having an approximately semicircular shape and has a number of through-holes 43 passing therethrough in a thickness direction.

The porous plate 35 is mounted above the tube-group outer casing 17 so as to extend laterally while covering the hot-side portion H of the upper barrel 5.

As indicated by the two-dot chain line in FIG. 1, the porous plate 35 may be provided at half the height of the annular channel 23, that is, at a position between the tube plate 11 and the steam/water separators 31, so as to cover the hot-side portion H of the tube-group outer casing 17.

The operation of the thus-configured steam generator 1 according to this embodiment will be described.

High-temperature and high-pressure primary coolant from a reactor (not shown) is introduced to the first water chamber 7 through a nozzle (not shown). This primary coolant is introduced from the first water chamber 7 to one end of each of the heat transfer tubes 13, circulates through the respective heat transfer tubes 13, and is discharged from the other end of each of the heat transfer tubes 13 to the second water chamber 9. The primary coolant is returned to the reactor from the second water chamber.

This circulation of the primary coolant keeps the heat transfer tubes 13 at a high temperature. At this time, a temperature gradient is produced by heat exchange with secondary-coolant-system water such that the temperature of the heat transfer tubes 13 is the highest at the first water chamber 7 side and is gradually reduced toward the second water chamber 9 side.

The secondary-coolant-system water supplied from the water supply box 29 is supplied to the cold-side portion C of the annular channel 23. Since this water is mixed with high-temperature hot water flowing out from the steam/water separators 31 at the cold-side portion C and cools this hot water, air bubbles included in the hot water are condensed and almost completely removed.

Although this mixed water partially moves to the hot-side portion H, it mainly flows down in the cold-side portion C of the annular channel 23 and is supplied to the inside of the tube-group outer casing 17 through the opening 25.

In this way, since the secondary-coolant-system water supplied to the cold-side portion C of the heat transfer tube group 15 has a relatively-low temperature, it is possible to produce a large temperature difference between the heat transfer tubes 13 in the second water chamber 9 side, having a relatively-low temperature, and the secondary-coolant-system water. Therefore, the amount of heat exchange can be increased in this portion.

On the other hand, hot water flowing out from the steam/water separators 31 that are disposed in the hot-side portion H is mainly supplied to the hot-side portion H of the annular channel 23. This hot water includes fine air bubbles that have not been separated by the steam/water separators 31 or is likely to generate air bubbles by involving ambient air.

Water that mainly includes this hot water moves downward through the through-holes 43 in the porous plate 35. At this time, since the flow of the water stagnates at portions of the porous plate 35 without the through-holes 43 and the like, air bubbles k that move downward when the water descends, in other words, air bubbles k that have small volumes and small buoyancies, are accumulated at these portions.

The accumulated air bubbles k collide with each other and coalesce to form air bubbles K that have large volumes. Since the buoyancies of the air bubbles K are increased when the volumes thereof are increased, the air bubbles K come up through the through-holes 43 against the descending water and are discharged to the space above.

As described above, it is possible to suppress, in the hot-side portion H, the occurrence of so-called carry-under, in which the air bubbles k descend together with secondary-coolant-system water.

Although this water partially moves to the cold-side portion C, it mainly flows down in the hot-side portion H of the annular channel 23 and is supplied to the inside of the tube-group outer casing 17 through the opening 25.

Since air bubbles can be removed by the porous plate 35 in this way, an increase in loss of water transfer pressure can be suppressed in the hot-side portion H. Therefore, since a reduction in the amount of supply water flowing in the hot-side portion H can be prevented, the amount of heat exchange in the hot-side portion H of the heat transfer tube group 15 can be maintained, as in a conventional manner.

Since a reduction in the amount of heat exchange in the hot-side portion H can be suppressed while maintaining the effect of increasing the amount of heat exchange in the cold-side portion C of the heat transfer tube group 15, as described above, the total heat transfer efficiency can be improved.

In this way, part of secondary-coolant-system water evaporates to become steam when it rises around the heat transfer tubes 13, which are maintained at a high temperature.

The water mixed with the steam is introduced to the steam/water separators 31 and is crudely separated into steam and water.

The steam crudely separated by the steam/water separators 31 is introduced to the moisture separator 33, and moisture contained therein is removed therefrom.

The steam from which moisture has been separated by the moisture separator 33 is sent to a turbine in the secondary system (not shown) from the steam outlet nozzle 41 provided on the top of the upper barrel 5. The turbine is rotationally driven by this steam, and its power drives a power generator, for example, to generate electric power.

Second Embodiment

Next, a second embodiment of the present invention will be described using FIGS. 4 to 7.

In this embodiment, the configuration of the tube supporting plates 19 is different from that of the first embodiment, and the other components are the same as those in the first embodiment; therefore, the difference therebetween will be mainly described below and a repeated description of the other components will be omitted.

Note that identical reference symbols are assigned to the same components as those in the first embodiment, and a description thereof will be omitted.

Figure 4:
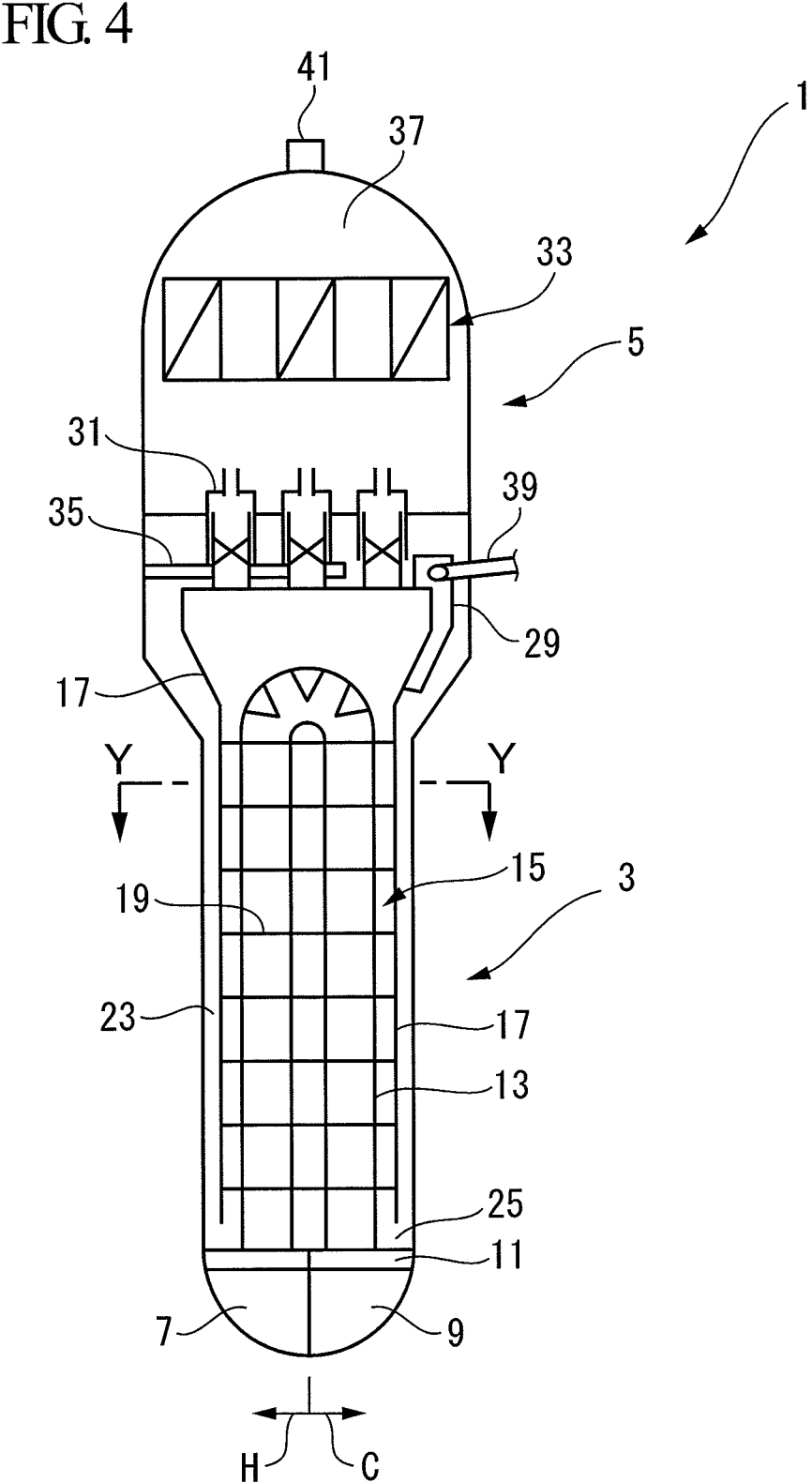
FIG. 4 is a longitudinal cross section schematically showing, in outline, the overall structure of a steam generator according to a second embodiment of the present invention.
Figure 5:
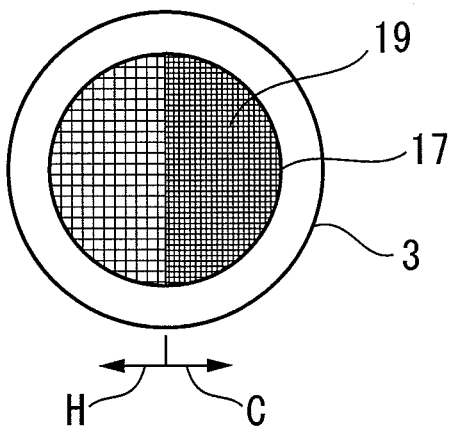
FIG. 5 is a cross section taken along arrows Y-Y shown in FIG. 4.

FIG. 4 is a longitudinal cross section schematically showing, in outline, the overall structure of the steam generator 1. FIG. 5 is a cross section taken along arrows Y-Y shown in FIG. 4.

In this embodiment, the sizes of the through-holes 21 in the tube supporting plates 19 are different between the hot-side portion H and the cold-side portion C.

Figure 6:
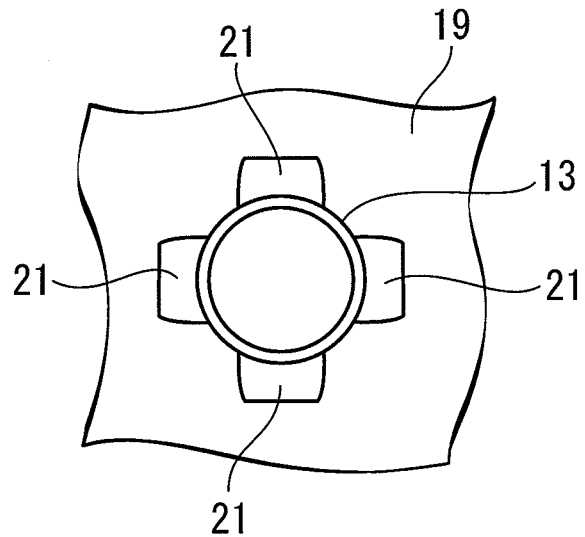
FIG. 6 is a partial cross section showing a cold-side portion of a tube supporting plate according to the second embodiment of the present invention.
Figure 7:
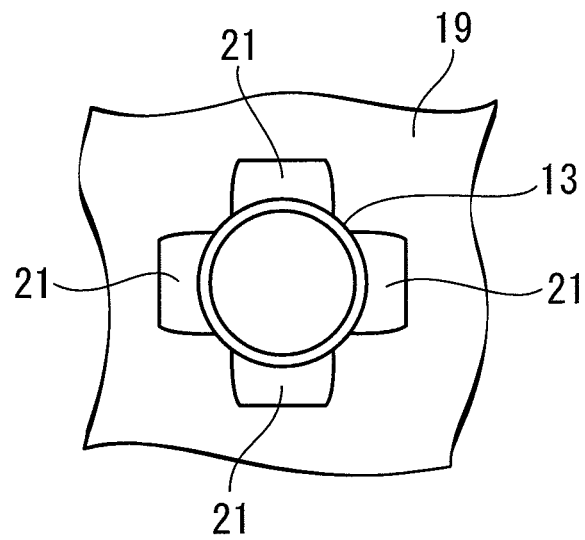
FIG. 7 is a partial cross section showing a hot-side portion of the tube supporting plate according to the second embodiment of the present invention.

Specifically, the sizes of the through-holes 21 in the hot-side portion H, shown in FIG. 7, are made larger than those of the through-holes 21 in the cold-side portion C, shown in FIG. 6. Therefore, the opening areas of the tube supporting plates 19 in the hot-side portion H are larger than the opening areas thereof in the cold-side portion C.

This makes the flow resistance in the hot-side portion H smaller than that in the cold-side portion C. Since water flow improves in the hot-side portion H when the flow resistance in the hot-side portion H is made smaller, the water easily circulates in the hot-side portion H, and the occurrence of an unstable flow can be suppressed.

Therefore, since a reduction in the amount of heat exchange in the hot-side portion H can be suppressed, the total heat transfer efficiency of the steam generator 1 can be improved.

Third Embodiment

Next, a third embodiment of the present invention will be described using FIGS. 8 and 9.

In this embodiment, the basic configuration is the same as that of the first embodiment, whereas the configurations of the air bubble removing member and the cold-side portion C of the heat transfer tube group 15 are different. The differences therebetween will be mainly described below, and a repeated description of the other components will be omitted.

Note that identical reference symbols are assigned to the same components as those in the first embodiment, and a description thereof will be omitted.

Figure 8:
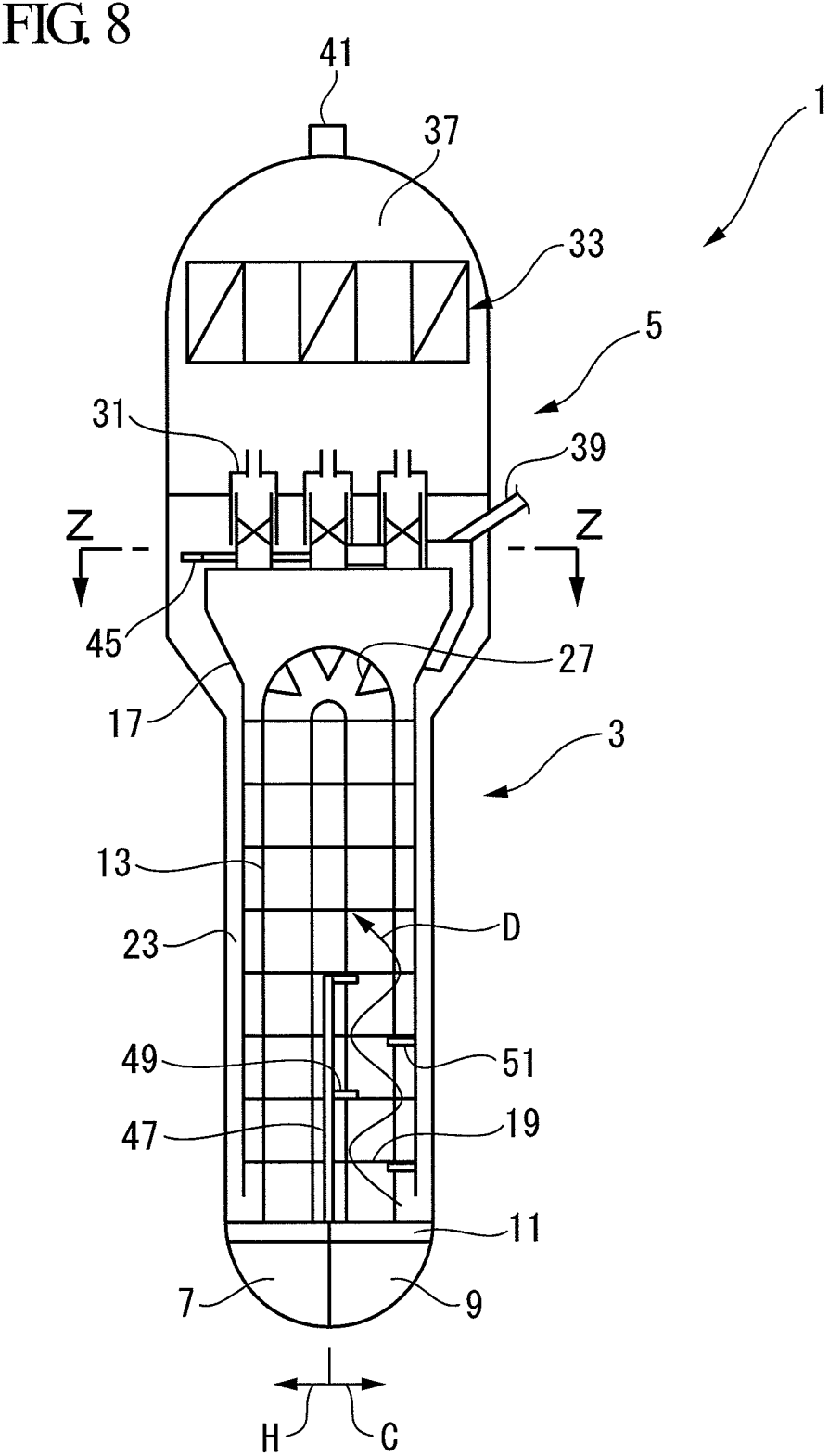
FIG. 8 is a longitudinal cross section schematically showing, in outline, the overall structure of a steam generator according to a third embodiment of the present invention.
Figure 9:
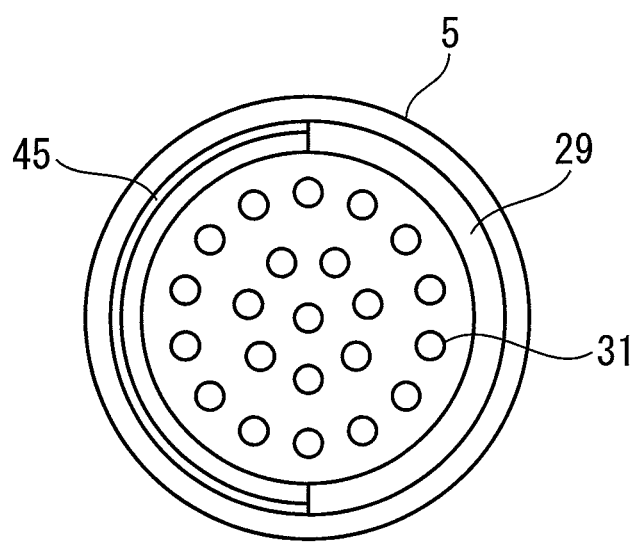
FIG. 9 is a cross section taken along arrows Z-Z shown in FIG. 8.

FIG. 8 is a longitudinal cross section schematically showing, in outline, the overall structure of the steam generator 1. FIG. 9 is a cross section taken along arrows Z-Z shown in FIG. 8.

In this embodiment, as an extension of the water supply box 29, a water supply pipe (water supply member) 45 having a semi-ring shape is positioned in the hot-side portion H of the annular channel 23 and is mounted to supply water to that portion.

The water supply pipe 45 is branched to supply water from the water supply box 29. The water supply pipe 45 has a pipe diameter smaller than the water supply box 29 and the amount of water supplied is sufficient to condense air bubbles included in water in the hot-side portion H. This amount is, for example, 5 to 10% of the amount of water the water supply box 29 supplies to the cold-side portion C.

As described above, since the water supply pipe 45 supplies a sufficient amount of water for condensing air bubbles, air bubbles in an upper portion of the hot-side portion H of the annular channel 23 are cooled and condensed by this water. Therefore, it is possible to suppress, in the hot-side portion H, the occurrence of so-called carry-under, in which air bubbles descend together with supply water.

Although this water partially moves to the cold-side portion C, it mainly flows down in the hot-side portion H of the annular channel 23 and is supplied to the inside of the tube-group outer casing 17 through the opening 25.

Since air bubbles can be removed by the cold water supplied by the water supply pipe 45 in this way, an increase in loss of water transfer pressure in the hot-side portion H can be suppressed. Therefore, since a reduction in the amount of supply water flowing in the hot-side portion H can be prevented, the amount of heat exchange in the hot-side portion H of the heat transfer tube group 15 can be maintained, as in a conventional manner.

Further, in this embodiment, a heat-transfer-tube partitioning plate 47 that partitions the hot-side portion H and the cold-side portion C is provided at a lower portion of the heat transfer tube group 15.

Semicircular-shaped flow adjusting plates 49 are attached to the cold-side portion C of the heat-transfer-tube partitioning plate 47 so as to be aligned with the second and fourth tube supporting plates 19 from the bottom.

Semi-ring-shaped flow adjusting plates 51 are attached to the cold-side portion C of the tube-group outer casing 17 so as to be aligned with the first and third tube supporting plates 19 from the bottom.

With the flow adjusting plates 49 and the flow adjusting plates 51, a water flow channel in the cold-side portion C serves as a serpentine channel D.

In this way, since water meanders upward along the serpentine channel D in the cold-side portion C of the heat transfer tube group 15 partitioned by the heat-transfer-tube partitioning plate 47, the water flows in lateral directions.

When the water flows in the lateral directions, the number of chances, in other words, the duration of time, for it to make contact with the heat transfer tubes 13 is increased compared with a case where the water simply rises, and thus the amount of heat received from the heat transfer tubes 13 can be increased accordingly.

Therefore, since the heat exchange efficiency in the cold-side portion C is further improved, it is possible to improve the total heat transfer efficiency of the steam generator 1, in combination with the fact that the amount of heat exchange in the hot-side portion H can be maintained, as in a conventional manner.

Fourth Embodiment

Next, a fourth embodiment of the present invention will be described using FIG. 10.

In this embodiment, the basic configuration is the same as that of the first embodiment, whereas the configuration of the water supply box 29 is different. The difference therebetween will be mainly described below, and a repeated description of the other components will be omitted.

Note that identical reference symbols are assigned to the same components as those in the first embodiment, and a description thereof will be omitted.

Figure 10:
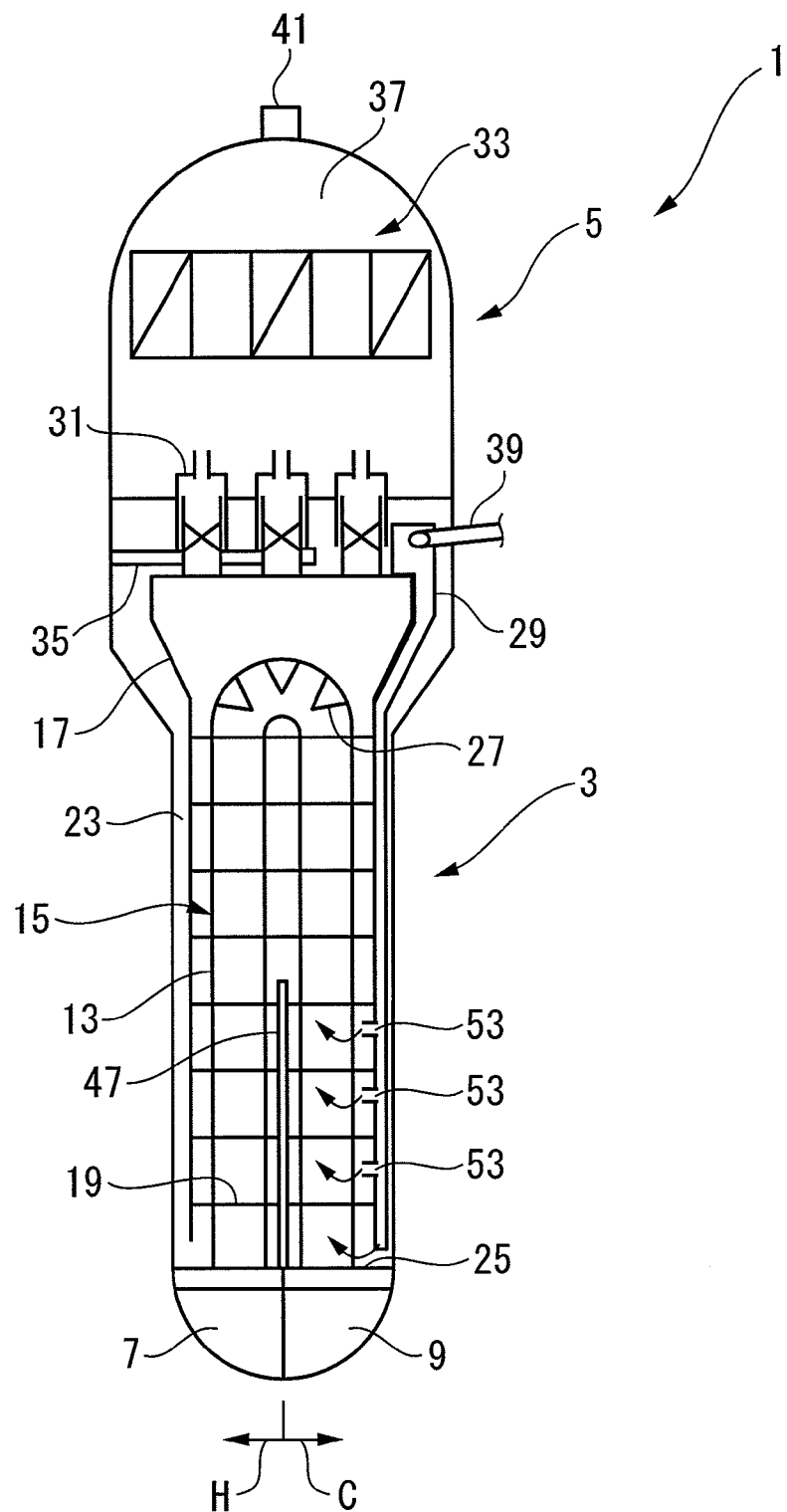
FIG. 10 is a longitudinal cross section schematically showing, in outline, the overall structure of a steam generator according to a fourth embodiment of the present invention.

FIG. 10 is a longitudinal cross section schematically showing, in outline, the overall structure of the steam generator 1.

In this embodiment, a lower portion of the water supply box 29 extends to almost a lower end position of the tube-group outer casing 17.

Inflow pores 53 that extend in a lateral direction to make the inside of the tube-group outer casing 17 communicate with the inside of the water supply box 29 are provided in the lower portion of the water supply box 29 at positions between the first and second tube supporting plates 19 from the bottom, between the second and third tube supporting plates 19 from the bottom, and between the third and fourth tube supporting plates 19 from the bottom. An appropriate number of inflow pores 53 may be provided as needed.

The heat-transfer-tube partitioning plate 47, which partitions the hot-side portion H and the cold-side portion C, is provided at the lower portion of the heat transfer tube group 15. The top of the heat-transfer-tube partitioning plate 47 is set higher than the position of the top inflow pore 53.

Secondary-coolant-system water supplied from the water supply box 29 passes through the opening 25 and the respective inflow pores 53 and is supplied in the lateral direction to the cold-side portion C inside the tube-group outer casing 17.

In other words, since water flows in the lateral direction, the number of chances, in other words, the duration of time, for it to make contact with the heat transfer tubes 13 is increased. Since the amount of received heat can be accordingly increased, the heat exchange efficiency can be improved.

Furthermore, since water is supplied through a plurality of points with gaps being provided therebetween in the vertical direction, the heat exchange efficiency is improved compared with a case where water is supplied through a single lowermost point. Therefore, the total heat transfer efficiency is improved.

Fifth Embodiment

Next, a fifth embodiment of the present invention will be described using FIGS. 11 to 14.

In this embodiment, the basic configuration is the same as that of the first embodiment, whereas the configuration of the annular channel 23 is different. The difference therebetween will be mainly described below, and a repeated description of the other components will be omitted.

Note that identical reference symbols are assigned to the same components as those in the first embodiment, and a description thereof will be omitted.

Figure 11:
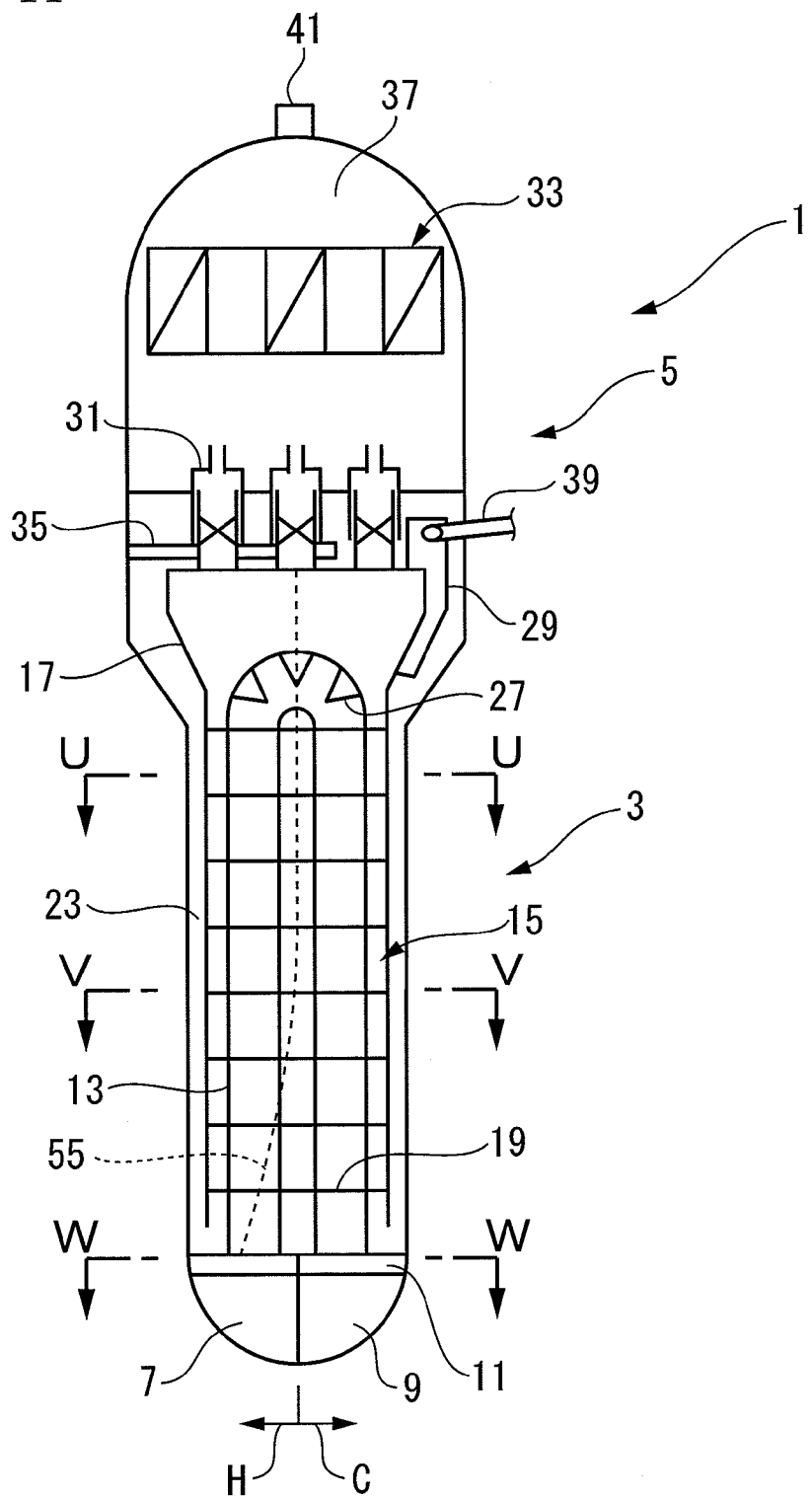
FIG. 11 is a longitudinal cross section schematically showing, in outline, the overall structure of a steam generator according to a fifth embodiment of the present invention.
Figure 12:
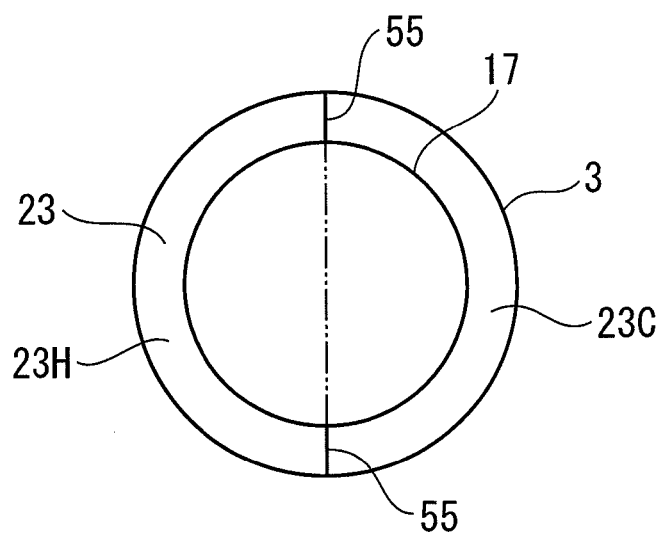
FIG. 12 is a cross section taken along arrows U-U shown in FIG. 11.
Figure 13:
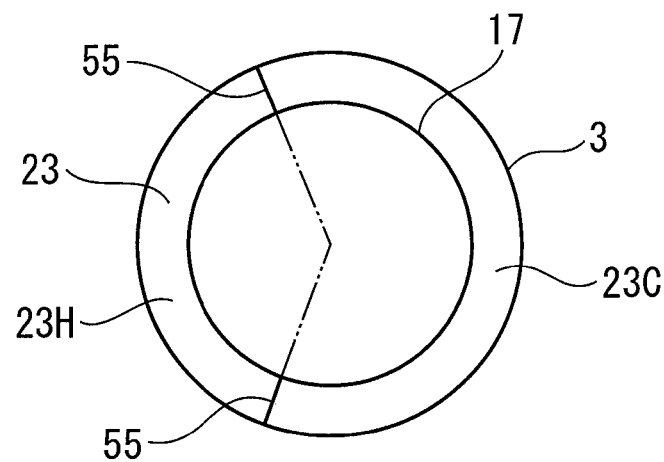
FIG. 13 is a cross section taken along arrows V-V shown in FIG. 11.
Figure 14:
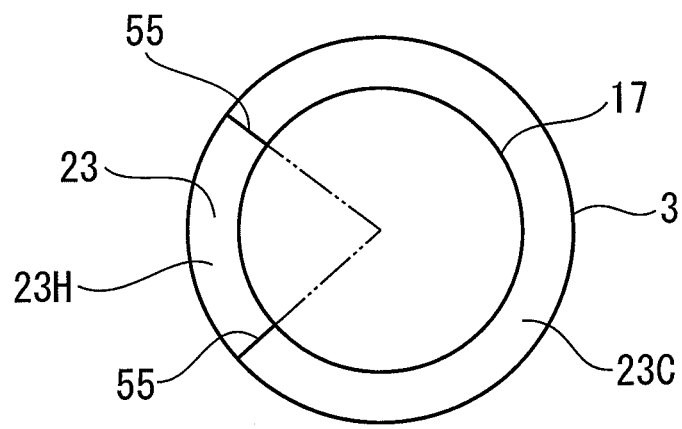
FIG. 14 is a cross section taken along arrows W-W shown in FIG. 11.

FIG. 11 is a longitudinal cross section schematically showing, in outline, the overall structure of the steam generator 1. FIG. 12 is a cross section taken along arrows U-U shown in FIG. 11. FIG. 13 is a cross section taken along arrows V-V shown in FIG. 11. FIG. 14 is a cross section taken along arrows W-W shown in FIG. 11.

In this embodiment, two partitioning plates 55 that extend vertically and that partition the annular channel 23 laterally are attached to the annular channel 23.

Upper portions of the partitioning plates 55 are positioned at the border between the hot-side portion H and the cold-side portion C to divide the annular channel 23 into the hot-side portion H and cold-side portion C.

Lower portions of the partitioning plates 55 are gradually curved toward the hot side in the downward direction. Therefore, a hot-side circumferential region 23H of the hot-side portion H of the annular channel 23 partitioned by the partitioning plates 55 is made gradually smaller than a cold-side circumferential region 23C of the cold-side portion C, as shown in FIGS. 13 and 14.

Secondary-coolant-system water is supplied from the water supply box 29 to the cold-side circumferential region 23C of the annular channel 23 and flows down. The cold-side circumferential region 23C enlarges downward so as to enter the area of the hot-side portion H.

Therefore, water entering the inside of the tube-group outer casing 17 through the opening 25 positioned at the hot-side portion H is a mix of relatively-hot water that has passed through the hot-side circumferential region 23H and relatively-cold water that has passed through the cold-side circumferential region 23C, thereby reducing the temperature of water to be supplied to the heat transfer tube group in the hot-side portion H.

When the temperature of the supply water at a lower position in the hot-side portion H is reduced, the difference in temperature between the heat transfer tubes 13 and the supply water is increased even in the hot-side portion H, and therefore, it is possible to improve the heat exchange efficiency in the hot-side portion H.

Sixth Embodiment

Next, a sixth embodiment of the present invention will be described using FIG. 15.

In this embodiment, the basic configuration is the same as that of the first embodiment, whereas the configuration of the anti-vibration bars 27 is different. The difference therebetween will be mainly described below, and a repeated description of the other components will be omitted.

Note that identical reference symbols are assigned to the same components as those in the first embodiment, and a description thereof will be omitted.

Figure 15:
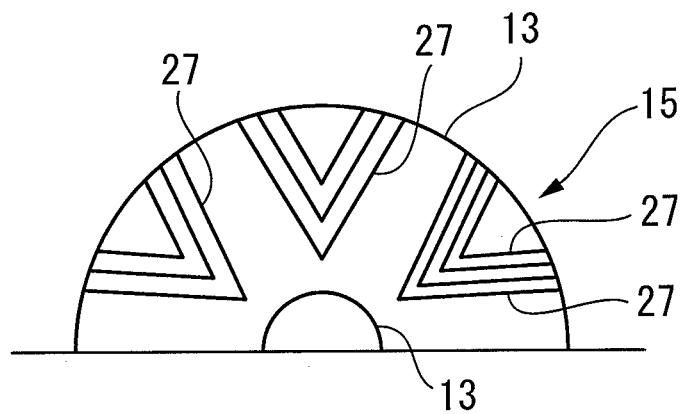
FIG. 15 is a schematic view showing an upper portion of a heat transfer tube group in a sixth embodiment of the present invention.

FIG. 15 is a schematic view showing an upper portion of the heat transfer tube group 15 in this embodiment.

In this embodiment, the anti-vibration bars 27 are arranged such that the arrangement density in the hot-side portion H is lower than that in the cold-side portion C.

The anti-vibration bars 27 serve as channel resistance when water flows. In this embodiment, since the arrangement density of the anti-vibration bars 27 in the hot-side portion H is lower than that in the cold-side portion C, the channel resistance in the cold-side portion C is larger than that in the hot-side portion H, and supply water flows in the hot-side portion H more easily than in the cold-side portion C.

Accordingly, more supply water flows in the hot-side portion H, and therefore, the proportion of air bubbles in the upper portion of the hot-side portion H can be reduced.

Therefore, since air bubbles can be prevented from being mixed into supply water to be supplied to the hot-side portion H in combination with air-bubble removal by an air bubble removing member such as the porous plate 35, it is possible to effectively prevent an unstable flow in the hot-side portion H and to improve the heat exchange efficiency.

Seventh Embodiment

Next, a seventh embodiment of the present invention will be described using FIG. 16.

In this embodiment, the basic configuration is the same as that of the first embodiment, whereas the inner configuration of the tube-group outer casing 17 is different. The difference therebetween will be mainly described below, and a repeated description of the other components will be omitted.

Note that identical reference symbols are assigned to the same components as those in the first embodiment, and a description thereof will be omitted.

Figure 16:
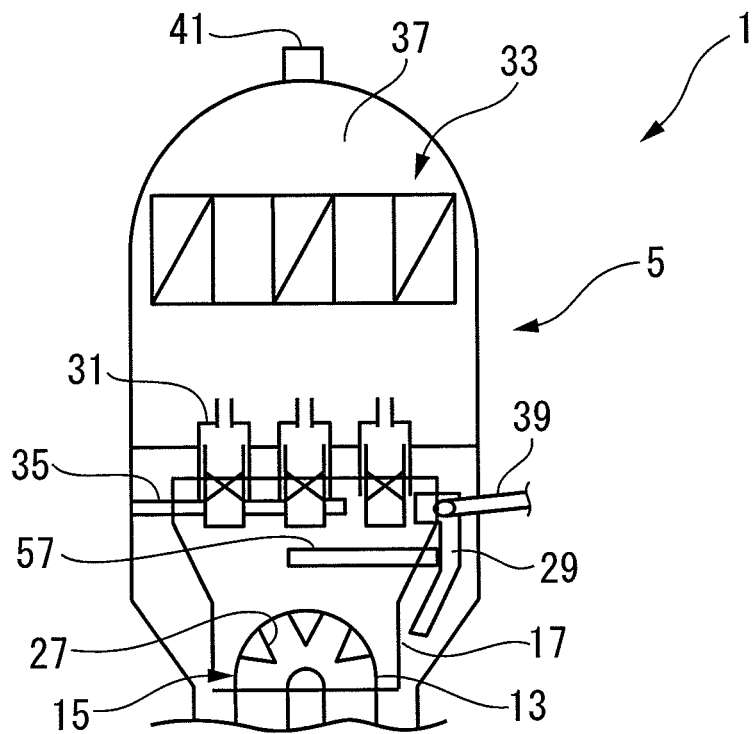
FIG. 16 is a longitudinal cross section schematically showing an upper barrel portion in a seventh embodiment of the present invention.

FIG. 16 is a longitudinal cross section schematically showing the upper barrel 5 in this embodiment.

In this embodiment, a resistance porous plate 57 having a plurality of through-holes is mounted between the heat transfer tube group 15 and the steam/water separators 31 at a position in the cold-side portion C in the tube-group outer casing 17.

The resistance porous plate 57 serves as channel resistance when water flows. Since the resistance porous plate 57 is mounted in the cold-side portion C, the channel resistance in the cold-side portion C is larger than that in the hot-side portion H, and supply water flows in the hot-side portion H more easily than in the cold-side portion C.

Accordingly, more supply water flows in the hot-side portion H, and therefore, the proportion of air bubbles in the upper portion of the hot-side portion H can be reduced.

Therefore, since air bubbles can be prevented from being mixed into supply water to be supplied to the hot-side portion H in combination with air-bubble removal by an air bubble removing member such as the porous plate 35, it is possible to effectively prevent an unstable flow in the hot-side portion H and to improve the heat exchange efficiency.

Eighth Embodiment

Next, an eighth embodiment of the present invention will be described using FIG. 17.

In this embodiment, the basic configuration is the same as that of the first embodiment, whereas the configurations of the steam/water separators 31 are different. The differences therebetween will be mainly described below, and a repeated description of the other components will be omitted.

Note that identical reference symbols are assigned to the same components as those in the first embodiment, and a description thereof will be omitted.

Figure 17:
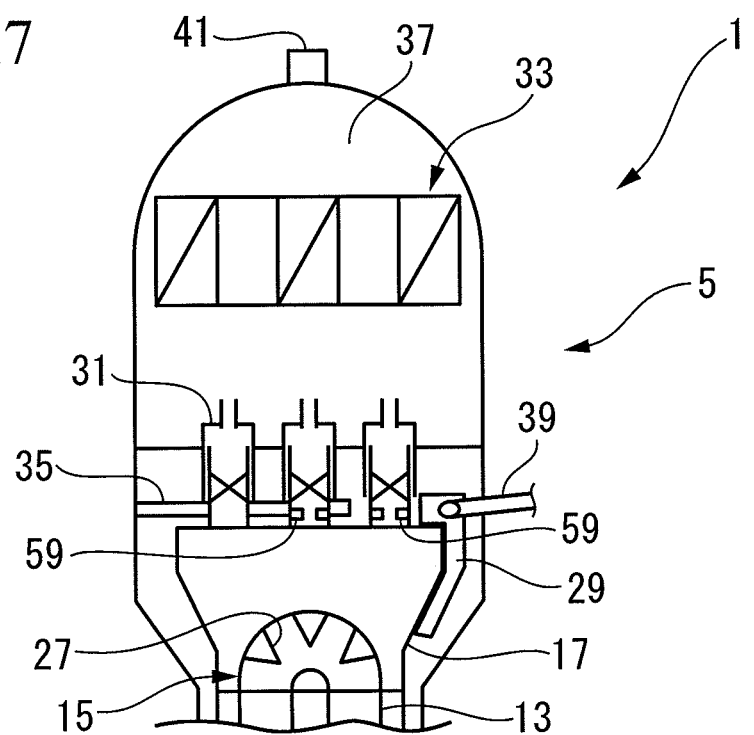
FIG. 17 is a longitudinal cross section schematically showing an upper barrel portion in an eighth embodiment of the present invention.

FIG. 17 is a longitudinal cross section schematically showing the upper barrel 5 in this embodiment.

In this embodiment, orifice channel resistances 59 are mounted at inlet ports of the steam/water separators 31 that are positioned in the cold-side portion C.

The orifice channel resistances 59 serve as channel resistance when water flows. Since the orifice channel resistances 59 are mounted to the steam/water separators 31 that are positioned in the cold-side portion C, the channel resistance in the cold-side portion C is larger than that in the hot-side portion H, and supply water flows in the hot-side portion H more easily than in the cold-side portion C.

Accordingly, more supply water flows in the hot-side portion H, and therefore, the proportion of air bubbles in the upper portion of the hot-side portion H can be reduced.

Therefore, since air bubbles can be prevented from being mixed into supply water to be supplied to the hot-side portion H in combination with air-bubble removal by an air bubble removing member such as the porous plate 35, it is possible to effectively prevent an unstable flow in the hot-side portion H and to improve the heat exchange efficiency.

The embodiments of the present invention have been described above in detail with reference to the drawings; however, the specific configurations are not limited to those embodiments, and design changes etc. can be included without departing from the scope of the present invention.

For example, the embodiments may be combined with each other and used.

The invention claimed is:

1. A steam generator comprising:
   a heat transfer tube group that is formed of a plurality of heat transfer tubes each having a U-shaped end opposite to ends that are secured to a tube plate, and each having a heat medium flow from one secured end toward another secured end;
   an annular channel that is formed so as to cover the circumference of the heat transfer tube group and that has an opening, at a lower portion thereof, that communicates with the heat transfer tube group;
   a water supply unit having a semi-ring shape that is disposed at an upper portion of the annular channel and that supplies water to a descending-side portion serving as an area where the heat medium in the heat transfer tubes descends toward the another secured end; and a steam/water separator that is disposed above the heat transfer tube group and that separates water heated while passing from the annular channel along the circumference of the heat transfer tubes into steam and hot water, wherein an air bubble removing member for removing air bubbles is provided in a rising-side portion that includes the annular channel, wherein the air bubble removing member is a water supply member having a semi-ring shape that is located on the rising-side portion to supply water to the rising-side portion for condensing the air bubbles, wherein the water supply member having the semi-ring shape is branched from the water supply unit to supply water in an amount that is sufficient to condense the air bubbles, and wherein a pipe diameter of the semi-ring shaped water supply member being smaller than a pipe diameter of the semi-ring shaped water supply unit.

2. A steam generator according to claim 1, wherein, in a tube supporting plate that supports the heat transfer tubes, the opening area in the rising-side portion is larger than the opening area in the descending-side portion.

3. A steam generator according to claim 1, wherein a heat-transfer-tube partitioning plate that partitions the rising-side portion and the descending-side portion is provided at a lower portion of the heat transfer tube group, and a channel in the descending-side portion partitioned by the heat-transfer-tube partitioning plate is a serpentine channel.

4. A steam generator according to claim 1, wherein anti-vibration bars inserted between the U-shaped ends of the heat transfer tubes adjacent to each other are arranged such that the arrangement density in the rising-side portion is lower than the arrangement density in the descending-side portion.

5. A steam generator according to claim 1, wherein a plurality of steam/water separators are provided, of which a steam/water separator that is positioned in the descending-side portion has an orifice channel resistance provided at the sides of its inlet port which restricts the ease with which the supply of water flows as compared to a steam/water separator that is positioned in the rising-side portion not having the orifice channel resistance at the sides of its inlet port to restrict the flow of supplied water thereby allowing the water supplied to flow more easily.

* * * * *